US005283495A

United States Patent [19]

Wendel et al.

[11] Patent Number: 5,283,495

[45] Date of Patent: Feb. 1, 1994

[54] ROTARY ACTUATOR FOR DETERMINING A FLOW CROSS SECTION OF A BY-PASS LINE AROUND A VALVE

[75] Inventors: Friedrich Wendel, Weissach; Johannes Meiwes, Markgroeningen; Dieter Dick, Muehlacker, all of Fed. Rep. of Germany

[73] Assignee: Robert Bosch GmbH, Stuttgart, Fed. Rep. of Germany

[21] Appl. No.: 917,063

[22] PCT Filed: Nov. 16, 1991

[86] PCT No.: PCT/DE91/00898

§ 371 Date: Aug. 5, 1992

§ 102(e) Date: Aug. 5, 1992

[87] PCT Pub. No.: WO92/10663

PCT Pub. Date: Jun. 25, 1992

[30] Foreign Application Priority Data

Dec. 5, 1990 [DE] Fed. Rep. of Germany ....... 4038761

[51] Int. Cl.[5] ........................ H02K 1/06; F16K 31/04

[52] U.S. Cl. ................................ 310/257; 310/49 A; 310/156; 251/65; 251/129.11

[58] Field of Search .................. 310/49 R, 49 A, 156, 310/257; 251/65, 129.01, 129.08, 129.11, 129.12; 123/337; 335/230, 272

[56] References Cited

U.S. PATENT DOCUMENTS

| | | | |
|---|---|---|---|
| 4,388,913 | 6/1983 | Grimm et al. | 123/585 |
| 4,412,517 | 11/1983 | Kobashi et al. | 123/334 |
| 4,426,988 | 1/1984 | Greiner et al. | 123/585 |
| 4,428,356 | 1/1984 | Kemmner | 123/585 |
| 4,494,517 | 1/1985 | Kratt et al. | 123/585 |
| 4,647,009 | 3/1987 | Idogzki et al. | 251/129.12 |
| 5,083,744 | 1/1992 | Reinicke et al. | 251/129.11 |
| 5,087,847 | 2/1992 | Giesbert et al. | 310/90 |

FOREIGN PATENT DOCUMENTS

| | | |
|---|---|---|
| 3830114 | 3/1990 | Fed. Rep. of Germany . |
| 3908545 | 9/1990 | Fed. Rep. of Germany . |

*Primary Examiner*—Steven L. Stephan
*Assistant Examiner*—D. R. Haszko
*Attorney, Agent, or Firm*—Edwin E. Greigg; Ronald E. Greigg

[57] ABSTRACT

A rotary actuator for setting the rotation angle of control elements, especially of a throttle device which determines the flow cross-section in a line through which flow passes, for internal-combustion engines, having an electric actuating motor with a two-pole stator, stator winding and two-pole permanent-magnet rotor. In order to achieve a compact construction and manufacture which is easy in production-engineering terms, the stator poles are constructed as claw poles which are connected on opposite end sides in each case to an annular jacket for the magnetic return path, which jacket surrounds the claw poles with a radial gap. The stator winding is located as an annular coil in the annular space between the annular jacket and the claw poles. In order to produce latching of the permanent-magnet rotor outside the claw pole gaps when no current is flowing in the stator winding, the claw poles are designed asymmetrically in such a manner that, on the one hand, the radial air gap width in the central claw pole region is greater than in the two claw pole edge regions and the radial widths of the claw pole edge regions are a different size.

27 Claims, 2 Drawing Sheets

ROTARY ACTUATOR FOR DETERMINING A FLOW CROSS SECTION OF A BY-PASS LINE AROUND A VALVE

PRIOR ART

The invention is based on a rotary actuator for setting the rotation angle of control elements, especially of a throttle device, which determines the flow cross-section in a line through which flow passes, for internal-combustion engines.

In a known rotary actuator of this type (DE 38 30 114 A1), the two stator poles for generating the magnetic restoring torque for the permanent-magnet rotor are constructed asymmetrically with a pole width, seen in the circumferential direction, deviating greatly from one another. The rotor poles, which are constructed as shell-shaped magnet segments, are arranged asymmetrically on the rotor and extend in each case over a circumferential angle of greater than 90°, the pole width, measured in the circumferential direction, of the stator pole having the smaller pole width having approximately the same angular extent as the rotor poles. The stator winding, through which DC current flows, engages as a cylindrical coil around a magnetic return path bracket, which connects the two stator poles to one another. Such a rotary actuator is highly cost-intensive in terms of production engineering, because of the great asymmetry of the actuating motor.

ADVANTAGES OF THE INVENTION

In contrast, the rotary actuator according to the invention, has the advantage of an actuating motor which is easy to manufacture in production-engineering terms, is of compact construction and whose magnetic latching torque is sufficiently large to rotate the throttle device back into its initial position, which releases a defined, minimum opening cross-section, when no current is flowing in the actuating motor. In this case, the rotor does not latch into the pole gaps, but rotates through 10° to 20° with respect to the pole gaps, because of the special air gap formation under the claw poles. In consequence, the rotation angle of the rotor is more than 50° in the one rotation direction and less than 30° in the other rotation direction. The rotary actuator according to the invention thus has a characteristic which is comparable to the so-called single-winding rotary actuators. The rotary actuator according to the invention is robust and has little susceptibility to defects.

Advantageous developments and improvements of the rotary actuator are possible by means of the measures outlined hereinafter.

If, according to a first embodiment of the invention, a reversible polarity DC current is applied to the stator winding, for example by connecting the stator winding to an output stage which can supply both polarities, by reversing the polarity, the throttle device can be transferred on the one hand into its closed position and on the other hand into its maximum open position. In this case, the closed position of the throttle device expediently lies in the actuating region of the rotor having the smaller rotation angle.

If, according to one preferred embodiment of the invention, a unidirectional DC current is applied to the stator winding, the polarity is defined such that, as the amperage increases, the rotor rotates in such a direction that the flow cross-section, which is released in each case by the throttle device, of the line through which flow passes initially falls to zero and then increases again to the maximum opening cross-section. The emergency mode of the rotary actuator, in which no current flows, is thus reached after the throttle device has passed through its closed position, which completely covers the opening cross-section.

Hard ferrite, plastic-bonded ferrite or plastic-bonded neodynian-iron-boron are used as magnetic materials for the permanent-magnet rotor. Rare earth magnetic materials are used in rotary actuators in the higher price range.

The permanent-magnet rotor may have a cylindrical permanent magnet with a diametric magnetisation direction, which permanent magnet holds the rotor shaft in a central, axial hole or is supported such that it can rotate on a knockout spindle. The permanent-magnet rotor can, however, also be implemented by means of two shell-shaped permanent-magnet segments, which are mounted on a cylindrical support, connected to the rotor shaft, preferably by means of plastic extrusion coating. The permanent-magnet segments have a radial magnetisation direction, the magnetisation direction running from the outside to the inside in the one magnet segment, and from the inside to the outside in the other magnet segment.

A version of the stator which is advantageous in production-engineering terms is achieved when, according to a preferred embodiment of the invention, the stator is assembled from two stator parts, of identical construction, each having one claw pole. In this case, the two stator parts are joined to one another, in a separating plane aligned at right angles to the stator axis, more specifically, after relative rotation of the two stator parts in the separating plane and relative rotation in a rotation plane extending along the stator axis at rightangles to the separating plane, in each case through 180°. In this version of the stator, the stator winding, which is wound onto a coil former consisting of plastic in the form of an annular coil, can be mounted on the stator particularly easily.

DRAWING

The invention is explained in more detail in the following description, using an exemplary embodiment shown in the drawing, in which:

FIG. 1 shows a longitudinal section of a rotary actuator for an internal-combustion engine, FIG. 2 shows a schematically represented exploded drawing of the stator and rotor of the actuating motor in the rotary actuator according to FIG. 1, and FIG. 3 shows a view of the/stator and rotor in the direction of the arrow III in FIG. 2.

DESCRIPTION OF THE EXEMPLARY EMBODIMENT

Figure 1:
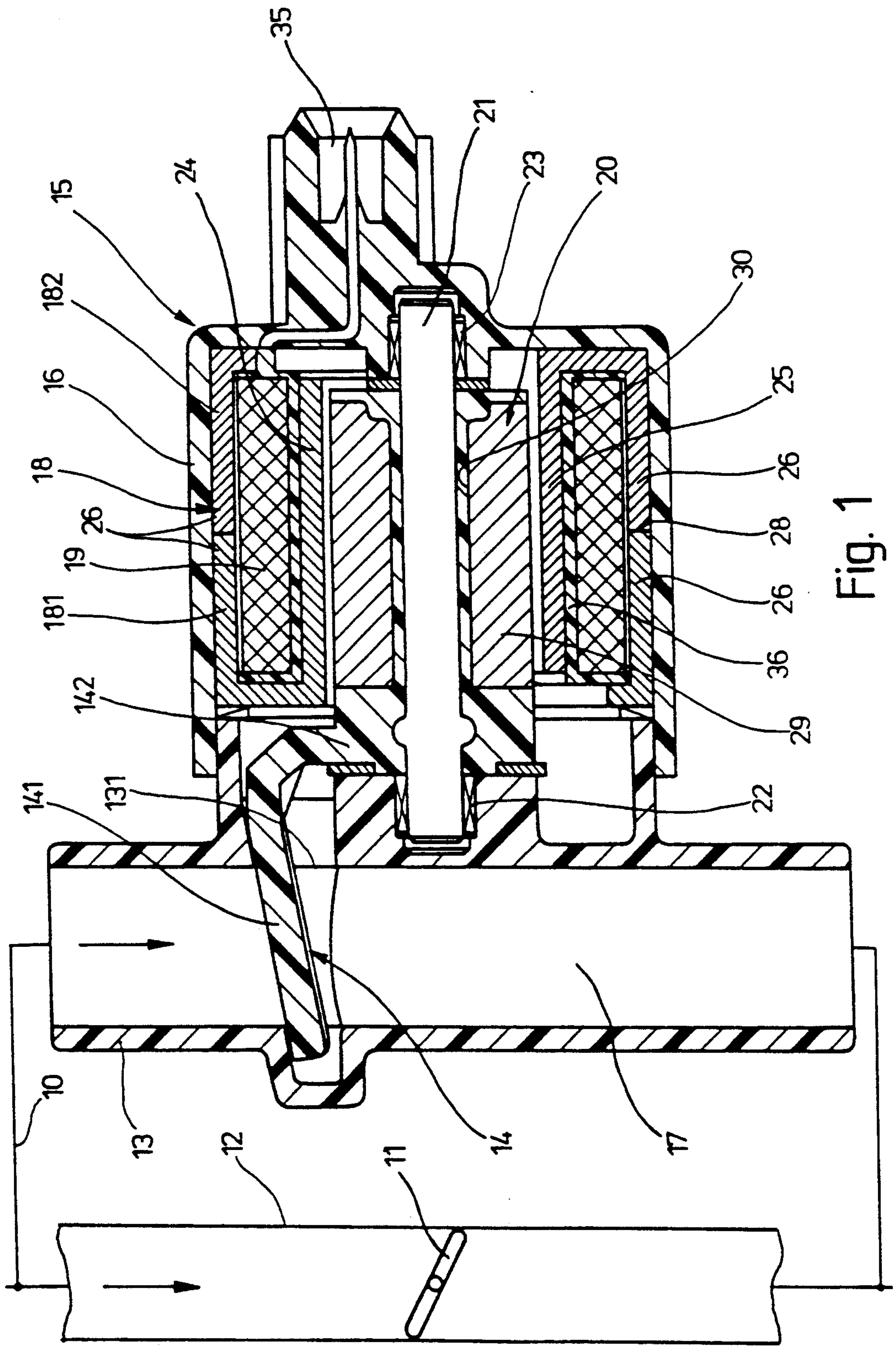

The rotary actuator, which is shown in longitudinal section in FIG. 1, is used for controlling the opening cross-section of a bypass line 10 around a throttle butterfly 11, shown schematically, in the induction pipe 12 of an internal-combustion engine, for the purpose of idling speed control. The rotary actuator has an actuator housing 13, consisting of plastic, in which an elongated channel 17, through which flow passes, is constructed in the bypass line 10. The opening cross-section of the channel 17 through which flow passes is controlled by a throttle device 14, which is constructed as a rotary slide valve and is driven by an actuating motor 15. The actuating motor 15 is accommodated in a motor housing 16 which is fastened to the actuator housing 13, at right angles thereto, the throttle device 14 with a control part 141 projecting through a curved passage 131 in the actuator housing 13, and passing through the actuator housing 13 essentially at right angles to the channel through which flow passes.

The actuating motor 15 consists of a stator 18, which is held on the motor housing 16 and has a stator winding 19, and a permanent-magnet rotor 20, which is coaxial thereto and is seated in a rotationally fixed manner on a rotor shaft 21 which, for its part, is supported by means of bearing points 22, 23 on the actuator housing 13 and on the motor housing 16, respectively, such that it can rotate. The throttle device 14 is connected in a rotationally fixed manner to the rotor shaft 22, by means of an attachment part 142. The throttle device 14 with the control part 141 and the attachment part 142 is produced integrally from plastic, the attachment part 142 being injection-moulded directly onto the rotor shaft 21. However, aluminium can also be considered as the material.

Figure 2:
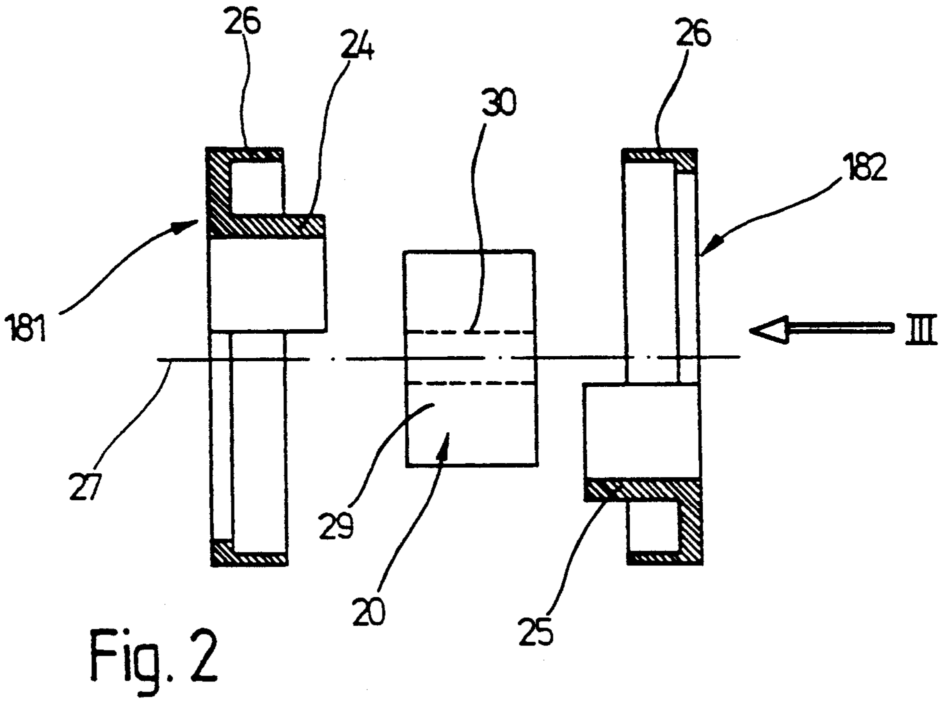
Figure 3:
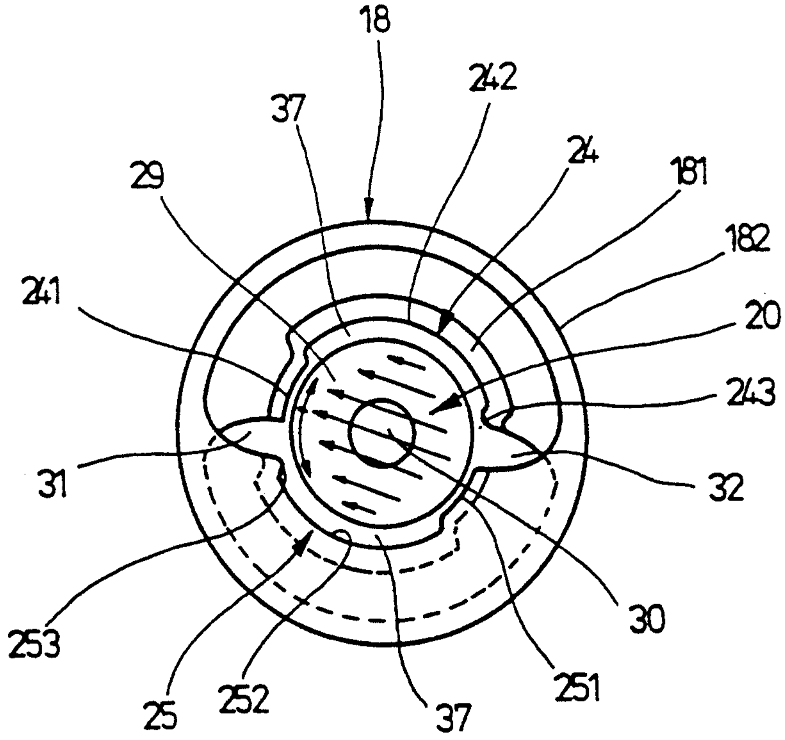

Constructed on the stator 18 are two claw poles 24, 25, which are arranged rotated through 180° with respect to one another and are connected on opposite end sides in each case to an annular jacket 26 for the magnetic return path, which jacket surrounds the claw poles 24, 25 with a radial gap. The stator winding 19, which is wound onto a coil former 36 in the form of an annular coil, is located in the annular space, which is bounded by the annular jacket 26 on the one hand and the claw poles 24, 25 on the other hand. In order to fit the stator winding 19 onto the stator 18 in a manner which is easy in production-engineering terms, said stator 18 is split into two identically constructed stator parts 181, 182, one claw pole 24 or 25, respectively, being arranged on each stator part 181, 182. The two stator parts 181, 182 are joined together in a separating plane 28, aligned at right angles to the stator axis 27, to be precise after relative rotation in the separating plane through 180° and after relative rotation in a rotation plane, which extends along the stator axis 27 at right angles to the separating plane 28, through 180°. The construction of the two stator parts 181, 182 can be seen, especially, from FIGS. 2 and 3. As can be seen especially from FIG. 3, the claw poles 24, 25 are of diametrically symmetrical construction, to be precise in such a manner that the air gap 37 under each claw pole 24, 25 is greater in the central pole region 242 or 252, respectively, than in the two pole edge regions 241, 243 or 251, 253, respectively, seen in the circumferential direction. In this case, the width, seen in the circumferential direction, of the one pole edge region 241 or 251, respectively, having a reduced air gap width is greater than that of the other pole edge region 243 or 253, respectively.

The rotor 20 has a cylindrical permanent magnet 29 with a diametric magnetisation direction, which permanent magnet holds the rotor shaft 21 in a central axial hole 30. Hard ferrite, plastic-bonded ferrite or plastic-bonded neodynian-iron-boron is used as the magnetic material. Magnetic materials consisting of rare earths can also be used. The magnetisation direction of the permanent magnet 29 is shown schematically in FIG. 3. The rotationally fixed connection of the permanent magnet 29 to the rotor shaft 21 takes place by extrusion coating with plastic, which is preferably carried out at the same time as the injection moulding of the throttle device 14. As is likewise indicated in FIG. 3, when no current is flowing in the stator winding 19, because of the described construction of the claw poles 24, 25, the rotor 20 is subjected to a restoring torque which rotates it back into an initial position shown in FIG. 3. In this case, because of the different width of the pole edge regions 241, 243 or 251, 253, respectively, the rotor 20 latches between the claw poles 24, 25, offset through approximately 10°–20° with respect to the pole gaps 31, 32. In consequence, as a result of corresponding DC current flowing through the stator winding 19, an operating angle of over 50° is obtained in the one rotation direction of the rotor, and an operating angle of less than 30° is obtained in the other rotation direction of the rotor 20.

The rotary actuator can optionally be operated with DC current of reversible polarity or with DC current of unidirectional polarity. To this end, in the first case, the stator winding 19 is connected to an output stage which can supply both polarities. In the other case, the stator winding 19 is connected to an output stage which supplies only one polarity. If reversible polarity DC current is applied to the stator winding 19, the rotation direction of the rotor 20 with the smaller operating angle is used to move the throttle device 14, and the rotation of the rotor 20 in the rotation direction having the larger operating angle is used to move the throttle device 14 into its limit position which releases the maximum opening cross-section of the channel 17 through which flow passes. If unidirectional polarity DC current is applied to the stator winding 19, said polarity is defined such that, as the intensity of the DC current increases, the rotor 20 rotates in such a direction that the flow cross-section of the channel 17 through which flow passes, released by the throttle device 14 initially falls to zero and then increases to a maximum again. Emergency operation of the rotary actuator, in which no current flows, is hence achieved after the throttle device 14 has passed through its closed position, which completely closes the flow channel 17. The stator winding 19 is electrically connected via a connecting plug 35 which is integrally formed on the base of the cup-shaped motor housing 16.

The invention is not limited to the exemplary embodiment described above. Thus, the permanent-magnet rotor may have two shell-shaped permanent-magnet segments which are mounted on a cylindrical support. The cylindrical support is seated in a rotationally fixed manner on the rotor shaft. The magnetisation direction of the two magnet segments is radial, the magnetisation direction of the one magnet segment of the rotor running from the outside to the inside, and that of the other magnet segment running from the inside to the outside. Once again, the magnet segments are mounted on the cylindrical support by means of plastic extrusion coating.

We claim:

1. A rotary actuator for setting a rotation angle of control elements, especially of a throttle device which determines a flow cross-section in a line through which a flow passes, for internal-combustion engines, having an electric actuating motor, which has a stator, with two stator poles and a stator winding, and a two-pole permanent-magnet rotor, and is constructed such that, when no current flows in the stator winding, a torque acts on the permanent-magnet rotor which rotates said permanent-magnet rotor back to an initial position, and having a rotationally fixed coupling of the throttle device related to the permanent-magnet rotor in such a manner that, in the initial rotor position, said throttle device releases a predetermined minimum opening cross-section in the line through which flow passes, the stator poles (24, 25), which are in each case connected on opposite end sides to an annular jacket (26) for a magnetic return path, which jacket surrounds the claw poles (24, 25) with a radial distance, in that the stator winding (19) is located as an annular coil in an annular space which is bounded by the annular jacket (26) and the claw poles (24, 25), and each claw pole (24, 25) is shaped such that a radial air gap width between the claw pole (24, 25) and the permanent-magnet rotor (20) is greater in a central claw pole region (242, 252) than in two claw pole edge regions (241, 243, 251, 253), seen in a circumferential direction, and a width, seen in the circumferential direction, of one of the claw pole edge regions (241, 251) having a reduced air gap width is greater than that of the other claw pole edge region (243, 253).

2. A rotary actuator according to claim 1, in which a reversible polarity DC current is applied to the stator winding (19).

3. A rotary actuator according to claim 1, in which a unidirectional polarity DC current is applied to the stator winding (19), which polarity is defined such that, as the current intensity increases, the permanent-magnet rotor (20) rotates in such a direction that the flow cross-section, of the line (17) through which flow passes, released by the throttle device (14) initially falls to zero and then increases to a maximum again.

4. A rotary actuator according to claim 1, in which the stator (18) consists of two identically constructed stator parts (181, 182), each having a claw pole (24, 25), which stator parts are joined to one another in a separating plane (28) aligned at right angles to the stator axis (27), after relative rotation in the separating plane (28), and relative rotation in a rotation plane extending along the stator axis (27) and at right angles to the separating plane (28), in each case through 180°.

5. A rotary actuator according to claim 2, in which the stator (18) consists of two identically constructed stator parts (181, 182), each having a claw pole (24, 25), which stator parts are joined to one another in a separating plane (28) aligned at right angles to the stator axis (27), after relative rotation in the separating plane (28), and relative rotation in a rotation plane extending along the stator axis (27) and at right angles to the separating plane (28), in each case through 180°.

6. A rotary actuator according to claim 3, in which the stator (18) consists of two identically constructed stator parts (181, 182), each having a claw pole (24, 25), which stator parts are joined to one another in a separating plane (28) aligned at right angles to the stator axis (27), after relative rotation in the separating plane (28), and relative rotation in a rotation plane extending along the stator axis (27) and at right angles to the separating plane (28), in each case through 180°.

7. A rotary actuator according to claim 1, in which one of a hard ferrite, plastic-bonded ferrite, neodynian-iron-boron or rare earths are used as the magnetic material for the permanent magnet rotor (20).

8. A rotary actuator according to claim 2, in which one of a hard ferrite, plastic-bonded ferrite, neodynian-iron-boron or rare earths are used as the magnetic material for the permanent magnet rotor (20).

9. A rotary actuator according to claim 3, in which one of a hard ferrite, plastic-bonded ferrite, neodynian-iron-boron or rare earths are used as the magnetic material for the permanent magnet rotor (20).

10. A rotary actuator according to claim 4, in which one of a hard ferrite, plastic-bonded ferrite, neodynian-iron-boron or rare earths are used as the magnetic material for the permanent magnet rotor (20).

11. A rotary actuator according to claim 1, in which the permanent-magnet rotor (20) has a cylindrical permanent magnet (29) with a diametric magnetization direction, which permanent magnet (29) holes a rotor shaft (21) rotationally fixed in an axial hole (30).

12. A rotary actuator according to claim 2, in which the permanent-magnet rotor (20) has a cylindrical permanent magnet (29) with a diametric magnetization direction, which permanent magnet (29) holes a rotor shaft (21) rotationally fixed in an axial hole (30).

13. A rotary actuator according to claim 3, in which the permanent-magnet rotor (20) has a cylindrical permanent magnet (29) with a diametric magnetization direction, which permanent magnet (29) holds a rotor shaft (21) rotationally fixed in an axial hole (30).

14. A rotary actuator according to claim 4, in which the permanent-magnet rotor (20) has a cylindrical permanent magnet (29) with a diametric magnetization direction, which permanent magnet (29) holds a rotor shaft (21) rotationally fixed in an axial hole (30).

15. A rotary actuator according to claim 7, in which the permanent-magnet rotor (20) has a cylindrical permanent magnet (29) with a diametric magnetization direction, which permanent magnet (29) holds a rotor shaft (21) rotationally fixed in an axial hole (30).

16. A rotary actuator according to claim 1, in which the permanent magnet rotor (20) has a cylindrical permanent magnet (29) with a diametric magnetization direction, which permanent magnet (29) is supported such that it rotates on a knockout spindle which passes through an axial hole (30) in the permanent magnet (29).

17. A rotary actuator according to claim 2, in which the permanent magnet rotor (20) has a cylindrical permanent magnet (29) with a diametric magnetization direction, which permanent magnet (29) is supported such that it can rotate on a knockout spindle which passes through an axial hole (30) in the permanent magnet (29).

18. A rotary actuator according to claim 3, in which the permanent magnet rotor (20) has a cylindrical permanent magnet (29) with a diametric magnetization direction, which permanent magnet (29) is supported such that it rotates on a knockout spindle which passes through an axial hole (30) in the permanent magnet (29).

19. A rotary actuator according to claim 4, in which the permanent magnet rotor (20) has a cylindrical permanent magnet (29) with a diametric magnetization direction, which permanent magnet (29) is supported such that it rotates on a knockout spindle which passes through an axial hole (30) in the permanent magnet (29).

20. A rotary actuator according to claim 7, in which the permanent magnet rotor (20) has a cylindrical permanent magnet (29) with a diametric magnetization direction, which permanent magnet (29) is supported such that it rotates on a knockout spindle which passes through an axial hole (30) in the permanent magnet (29).

21. A rotary actuator according to claim 1, in which the permanent-magnet rotor has two shell-shaped magnet segments, which are mounted on a cylindrical support and have a radial magnetization direction, the magnetization direction running from the outside to the inside in the one magnet segment, and from the inside to the outside in the other magnet segment.

22. A rotary actuator according to claim 2, in which the permanent-magnet rotor has two shell-shaped magnet segments, which are mounted on a cylindrical support and have a radial magnetization direction, the magnetization direction running from the outside to the inside in the one magnet segment, and from the inside to the outside in the other magnet segment.

23. A rotary actuator according to claim 3, in which the permanent-magnet rotor has two shell-shaped magnet segments, which are mounted on a cylindrical support and have a radial magnetization direction, the magnetization direction running from the outside to the inside in the one magnet segment, and from the inside to the outside in the other magnet segment.

24. A rotary actuator according to claim 4, in which the permanent-magnet rotor has two shell-shaped magnet segments, which are mounted on a cylindrical support and have a radial magnetization direction, the magnetization direction running from the outside to the inside in the one magnet segment, and from the inside to the outside in the other magnet segment.

25. A rotary actuator according to claim 7, in which the permanent-magnet rotor has two shell-shaped magnet segments, which are mounted on a cylindrical support and have a radial magnetization direction, the magnetization direction running from the outside to the inside in the one magnet segment, and from the inside to the outside in the other magnet segment.

26. A rotary actuator according to claim 11, in which the permanent-magnet rotor has two shell-shaped magnet segments, which are mounted on a cylindrical support and have a radial magnetization direction, the magnetization direction running from the outside to the inside in the one magnet segment, and from the inside to the outside in the other magnet segment.

27. A rotary actuator according to claim 16, in which the permanent-magnet rotor has two shell-shaped magnet segments, which are mounted on a cylindrical support and have a radial magnetization direction, the magnetization direction running from the outside to the inside in the one magnet segment, and from the inside to the outside in the other magnet segment.

* * * * *